US 8,222,535 B2

(12) United States Patent
Frech et al.

(10) Patent No.: US 8,222,535 B2
(45) Date of Patent: Jul. 17, 2012

(54) NOISE REDUCING CIRCUIT ARRANGEMENT

(75) Inventors: Roland Frech, Ostfildern (DE); Thomas-Michael Winkel, Schoenaich (DE); Erich Klink, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/169,778

(22) Filed: Jul. 9, 2008

(65) Prior Publication Data

US 2008/0283285 A1    Nov. 20, 2008

(30) Foreign Application Priority Data

Jul. 20, 2007    (EP) .................................... 07112819

(51) Int. Cl.
*H05K 1/11* (2006.01)
*H05K 7/00* (2006.01)
(52) U.S. Cl. .................. 174/261; 361/780; 361/784
(58) Field of Classification Search .......... 174/250–268; 361/780, 794–795
See application file for complete search history.

(56) References Cited

U.S. PATENT DOCUMENTS

| | | | | |
|---|---|---|---|---|
| 6,335,494 B1 * | 1/2002 | Gregor et al. | ................ | 174/261 |
| 6,521,842 B2 * | 2/2003 | Brinthaupt et al. | ........... | 174/252 |
| 7,047,628 B2 * | 5/2006 | Lee | ................................. | 29/830 |
| 7,069,646 B2 * | 7/2006 | Duxbury et al. | ................ | 29/830 |
| 7,983,055 B2 * | 7/2011 | Kim et al. | ...................... | 361/763 |
| 2001/0010395 A1 * | 8/2001 | Ball et al. | ...................... | 257/690 |
| 2005/0225955 A1 * | 10/2005 | Grebenkemper et al. | ..... | 361/780 |
| 2007/0111576 A1 * | 5/2007 | Becker et al. | ................. | 439/260 |
| 2009/0045889 A1 * | 2/2009 | Goergen et al. | .............. | 333/175 |

* cited by examiner

*Primary Examiner* — Zachary M Pape
(74) *Attorney, Agent, or Firm* — Steven Chiu (57) ABSTRACT

A circuit arrangement comprising a set of signal layers, a set of first power layers, a set of second power layers, a set of signal vias, a set of first power vias, a set of second power vias, wherein a signal via of the set of signal vias provides a signal path for a high-frequency (HF) signal current, wherein at least a power via of the set of first power vias and at least a power via of the set of second power vias provide return paths for return currents associated with the signal current, wherein the return path provided by the power via of the set of second power vias is connected with a power layer of the set of second power layers, wherein at least one power layer of the set of first power layers is arranged between the power layer of the set of second power layers and each signal layer of the set of signal layers.

21 Claims, 4 Drawing Sheets

NOISE REDUCING CIRCUIT ARRANGEMENT

BACKGROUND OF THE INVENTION

The present invention relates to a circuit arrangement.

Circuit arrangements can be regarded as electric or electronic circuits implemented on a particular structure, e.g. on a printed circuit board, a single-chip module (SCM) or a multi-chip module (MCM). A circuit arrangement is a sandwiched structure which comprises signal layers that are sandwiched between ground and voltage layers.

In more complex circuit arrangements, e.g. on circuit boards for computer systems, there is a need to supply the circuit arrangement with more than two voltage levels as represented by the nominal supply voltage and ground, so that very often, a third voltage level or even more voltage levels must be implemented on a circuit board. The voltage layers may therefore relate to different potentials with respect to ground. The nominal supply voltage is very often denoted as VDD, and the other above mentioned third voltage level is often denoted as V3. For example, the ground voltage can be at 0 Volt, VDD can be at 1.8 Volt, and V3 can be set to 1.5 Volt.

The voltage layers, also referred to in the following as power layers, might consist of a layer of electrically conductive material. A special kind of voltage layer is the ground layer which is at a potential of 0 Volt. In contrast to the voltage and ground layers, the signal layers of a circuit board comprise signal wires that are used to carry high-frequency electric currents. A signal via corresponds to one or more signal wires that run in essence perpendicular to the sandwiched layer structure and that connect wires of different signal planes. If a signal via penetrates a voltage plane or a ground plane, a so called void or anti-pad is generated to avoid shorting the signal carried by the signal via to the ground or power plane.

US published application 2007/0111576 A1 discloses a circuit on a printed circuit board comprising wiring dedicated to supply electric board components which comprises at least three different reference planes characterized by capacitance provided for a given signal wiring in a discontinuity section, wherein the discontinuity causes a broken high-frequency return path of the current signal wiring, and wherein the capacitance is formed by a voltage island placed within a signal layer located next to the given signal wiring.

The voltage islands placed within a signal layer has the disadvantage that they impact the wiring capabilities of the circuit boards or circuit cards, especially in space limited areas. The usage of voltage islands within circuit boards or within circuits comprised on circuit boards is therefore not generally applicable.

SUMMARY OF THE INVENTION

It is therefore an object of an embodiment of the invention to provide an improved circuit arrangement for, e.g., a circuit board.

According to an aspect of an embodiment of the invention, there is provided a circuit arrangement. In accordance with an embodiment of the invention, the circuit arrangement comprises a set of signal layers, a set of first power layers, a set of second power layers, a set of signal vias, a set of first power vias, and a set of second power vias. A signal via of the set of signal vias provides a signal path for a high-frequency (HF) signal current. At least a power via of the set of first power vias and at least a power via of the set of second power vias provide return paths for return currents associated with the signal current. The return path provided by the power via of the set of second power vias is connected with a power layer of the set of second power layers. At least one power layer of the set of first power layers is arranged between the power layer of the set of second power layers and each signal layer of the set of signal layers.

The return path for the return current flowing through the power via of the set of second power vias comprises a discontinuity. The discontinuity occurs when this return current flows in form of a displacement current from a power via of the first set of power vias or from a power layer of the set of first power layers to the power via of the set of second power vias or to the power layer of the set of second power layers to which the power via of the set of second power vias is connected. The displacement current generates an electromagnetic (EM) wave that travels in the dielectric region through which the displacement current flows. The circuit arrangement in accordance with the invention is designed so that the discontinuity lies between the power layer of the set of second power layers and the power layer of the set of first power layers. There is no signal layer sandwiched in between these layers. Thus, the EM wave is confined between the power layer of the set of second power layers and the power layer of the set of first power layers and does not have any effect on the signal wires of a signal layer. In particular, the signal wires would act as little antennas that would draw energy out of the EM wave which would result in noise in the signal wires. In other words, the EM wave would couple into the signal wires and generate noise therein. Due to the circuit arrangement in accordance with the invention, this effect does however not occur.

In accordance with an embodiment of the invention, the power layer of the set of second power layers is bordered at the bottom and/or at the top by power layers of the set of first power layers. The circuit arrangement can thus comprise multiple and single reference regions. In particular, the power layer of the set of second power layers define the multiple reference regions at the top and/or bottom and the power layers of the set of first power layers define a single reference region at the centre of the arrangement.

In accordance with an embodiment of the invention, the power layer of the set of second power layers is embedded in power layers of the set of first power layers.

In accordance with an embodiment of the invention, the power via of the second set of power via ends at the power layer of the set of second power layers, wherein a power via of the first set of power vias ends at the power layer of the first power layer bordering the power layer of the set of second power layers, wherein the power via of the first set of power vias and the power via of the second set of power vias face each other.

A discontinuity of the return path of a return current that flows through the power via of the second set of power via lies between the power via of the second set of power vias and the power via of the first set of power vias. As there is no signal layer located between the power layer of the set of first power layers and the power layer of the set of second power layers, the EM wave generated by the displacement current flowing through the discontinuity is not able to couple into a signal wire of the signal layer.

In accordance with an embodiment of the invention, each signal layer of the set of signal layers is bordered by layers of the set of first power layers and each layer of the set of second power layers is separated from each signal layer by at least a layer of the set of first power layers.

Preferably, the power layers of the set of first power layers relate to ground layers. Thus, each signal layer is bordered by ground layers. Voltage layers of the circuit arrangement relate then to the set of second power layers and are separated from the signal layers so that at least one ground layer is situated between each voltage layer and each signal layer.

In accordance with an embodiment of the invention, each layer of the set of second power layers is bordered by layers of the set of first power layers. Thus, the signal layers are separated from the second power layers since at least a layer of the set of first power layers, which is preferably a ground layer, is placed in between a layer of the set of second power layers, which is preferably a voltage layer, and a signal layer.

In accordance with an embodiment of the invention, a signal via of the set of signal vias is adapted to provide an electric connection for a signal wire of a signal layer of the set of signal layers, wherein a power via of the set of first power vias is adapted to provide an electric connection for a power layer of the set of first power layers, and wherein a power via of the set of second power vias is adapted to provide an electric connection for a power layer of the set of second power layers, wherein the signal vias and power vias of the sets of first and second power layers pass through voids in the layers to which the signal and power vias are not connected.

In accordance with an embodiment of the invention, the power layers of the set of first power layers relate to ground layers. The power layers of the set of second power layers relate to voltage layers. The power vias of the set of first power vias relate to ground vias and the power vias of the set of second power vias relate to voltage vias.

In accordance with an embodiment of the invention, the power layers of the set of first power layers and of the set of second power layers comprise electrically conductive solid planes.

In accordance with an embodiment of the invention, the power layers of the set of first power layers and of the set of second power layers comprise electrically conductive mesh planes. Each power layer comprises an electrically conductive mesh instead of a solid plane.

According to another aspect of the invention, there is provided a printed circuit board (PCB) comprising the circuit arrangement in accordance with the invention.

According to another aspect of the invention, there is provided a single chip module (SCM) comprising the circuit arrangement in accordance with the invention.

According to a further aspect of the invention, there is provided a multichip module (MCM) comprising the circuit arrangement in accordance with the invention.

According to another aspect of the invention, there is provided a computer system comprising the circuit arrangement in accordance with the invention.

BRIEF DESCRIPTION OF THE DRAWINGS

In the following embodiments of the invention will be described in greater detail by way of example only making reference to the drawings in which.

DETAILED DESCRIPTION

Figure 1:
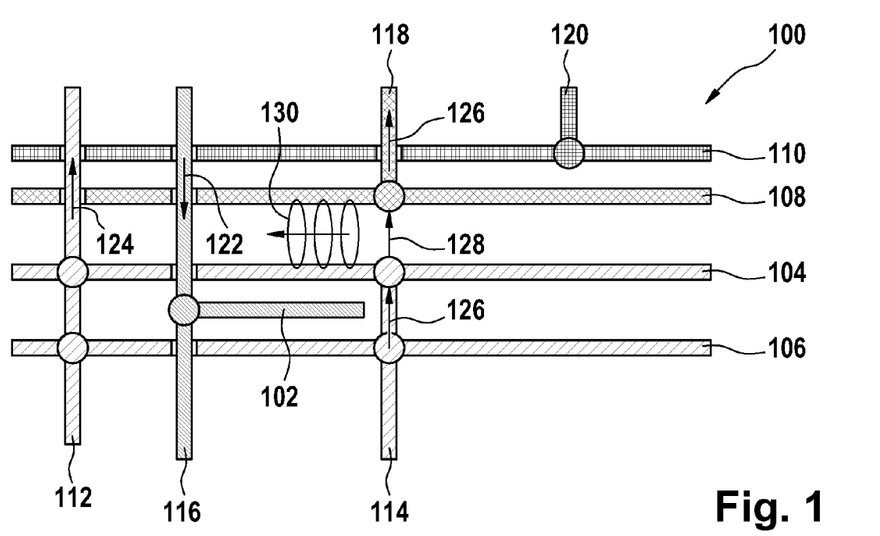
FIG. 1 shows a schematic cross sectional view of a circuit arrangement.

FIG. 1 shows a schematic cross sectional view of a circuit arrangement 100. The circuit arrangement 100 comprises a signal layer 102, ground layers 104 and 106, and voltage layers 108 and 110. The ground layers 104 and 106 are interconnected with each other by so called ground vias 112 and 114. The ground via 112 passes the voltage layers 108 and 110 through voids in these layers.

A signal via 116 connects the signal layer 102 with, e.g., another signal layer not show in FIG. 1. In particular, the signal layers 102 comprises signal wires so that the signal via 116 provides an electric connection for a signal wire of the signal layer 102 with a signal wire of the other signal layer not shown here.

The voltage layer 108 is further connected with a voltage via 118 and the voltage layer 110 is connected with a voltage via 120. The voltage vias 118 and 120 provide electric connections for the voltage layers 108 and 110, respectively, with another region of the arrangement, e.g., a power domain. The voltage layers 108 and 110 are at different potentials and the voltage via 118 passes through a void in the voltage layer 110.

The signal via 116 provides a signal path for a high frequency (HF) signal current 122. The signal current 122 is depicted as arrow and flows for example in the downward direction. The HF signal current 122 generates due to electromagnetic induction a return current 124 in the ground via 112 and a return current 126 in the voltage via 118 as indicated by the arrows. Locally, the return currents 124, 126 are directed opposite to the signal current 122, but the return currents 124, 126 travel along with the signal current 122.

With regard to the return current 124, the signal via 116 and the ground layer 106 provide a closed return path for the return current 124 when the associated signal current 122 travels along the signal via 116 and then in the signal layer 102.

In contrast thereto, the signal path of the return current 126 comprises a discontinuity between the voltage via 126 and the ground via 114. The return current 126 "flows" as displacement current 128 through the dielectricum located between the voltage layer 108 and the ground layer 104 and then further on through the ground via and/or through the ground plane 104.

The HF displacement current 128 can be regarded as a little antenna which emits an electromagnetic (EM) wave 130 that propagates in the dielectricum between the ground layer 104 and voltage layer 108. The circuit arrangement 100 is particularly advantageous as the ground layer 104 is arranged between the voltage layer 108 and the signal layer 102 so that the EM wave 130 generated by the displacement current 128 in the dielectricum between the layers 104 and 108 does not have any effect on the signal wires of the signal layer 102. In particular, the signal wires can be regarded as little antennas that would draw energy out of the EM wave 130 which can be seen as unwanted noise in the signal wires of the signal layer 102.

A person skilled in the art will appreciate that return currents might also be induced in other vias or layers. The arrangement in accordance with the invention is designed in a way that a discontinuity of a return path that is bridged by a return current in form of a displacement current is separated from a signal layer by at least a ground layer so that the EM wave generated by the displacement current cannot couple into signal wires on the signal layer.

Figure 2:
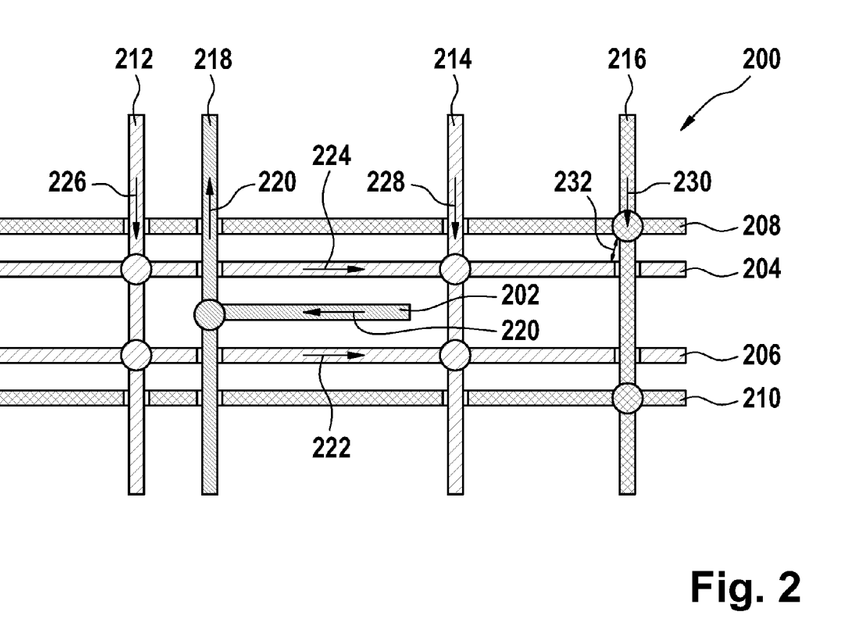
FIG. 2 shows a schematic cross sectional view of a circuit arrangement.

FIG. 2 shows a schematic cross sectional view of a circuit arrangement 200. The circuit arrangement 200 comprises a signal layer 202, ground layers 204 and 206, and voltage layers 208 and 210. The ground layers 204 and 206 are interconnected with each other by ground vias 212 and 214. The voltage layers 208 and 210 are interconnected with each other by use of a voltage via 216. Furthermore, the signal layer 202 is connected with a signal via 218.

The ground vias 212 and 214, the voltage via 216, as well as the signal via 218 pass the various layers 208-210 through voids that prevent a shortage of the vias with the corresponding layers.

The signal layer 202 comprises signal wires that are for simplicity reasons not shown in FIG. 2. In particular, the signal via 218 is connected with one of the signal wires of the signal layer 202 and therefore provides a connection for this signal wire to for example another signal wire of another signal layer.

The signal via 218 and the wire to which the signal via 218 is connected can be regarded as a signal path for a HF signal current 220. The HF signal current 220 flows for example in the signal layer 202 from right to left and then in an upward direction through the signal via 218 as indicated by the arrows.

The signal current 220 is accompanied by return currents 222, 224, 226, 228, and 230 through the ground layers 204, 206 and the ground and voltage vias 212, 214, and 216.

The return path for the return current 230 which is the return current flowing through the voltage via 216 when the HF signal current 220 travels from the signal layer 202 in the upward direction along the signal via 218 comprises a discontinuity as the return current 230 flows through the dielectricum between the layers 204 and 208 in form of a HF displacement current 232.

The displacement current 232 generates an EM wave traveling in a radial manner in the dielectric region between the layer 204 and 208. The attenuation of the EM wave scales as 1/SQRT(R), wherein SQRT refers to the square root of R, and wherein R is the radial distance from the discontinuity. The attenuation is therefore not very strong and the EM wave is therefore able to pass relatively large distances within the dielectric region between the layers 204 and 208.

The arrangement 200 in accordance with the invention is particularly advantageous as no signal layer is comprised between the layers 204 and 208 so that the EM wave cannot couple into a signal wire and cause coupled noise therein. As the ground layer 204 is located between the voltage layer 208 and the signal layer 202, the discontinuity of the return path is located between the voltage layer 208 and the ground layer 204 so that the EM wave is generated between the voltage layer 208 and the ground layer 204 and is therefore not able to couple into wires of the signal layer 202. The ground layer 204 thus effectively shields the signal layers, and in particular the signal wires on the signal layer 202 from the EM wave.

A coupling of the generated EM wave in the signal via 218 passing through the dielectricum between the ground layer 204 and the signal layer 208 is negligible as the orientation of the signal via 218 with respect to the EM wave is such that the EM wave is not able to couple into the signal via 218.

Figure 3:
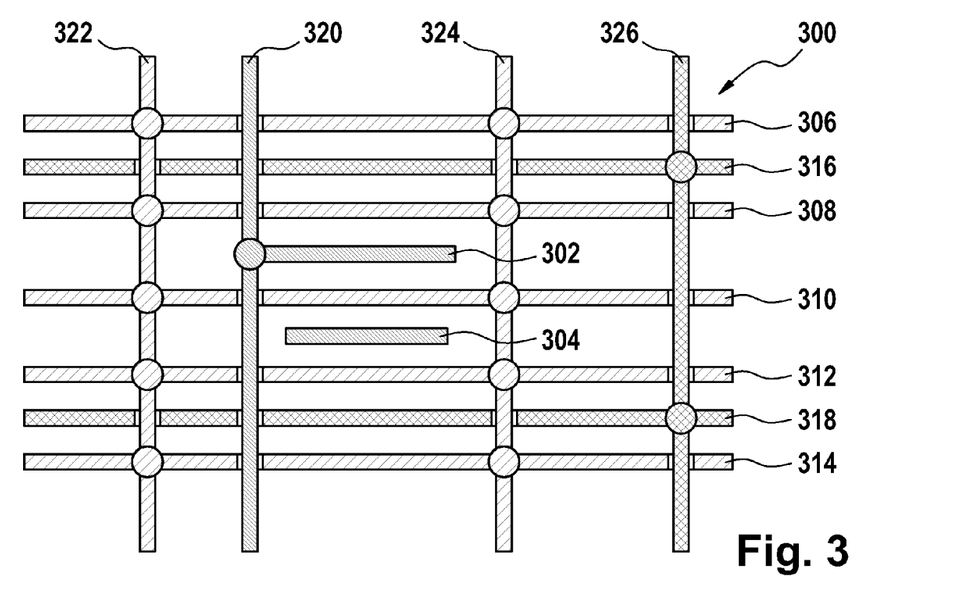
FIG. 3 shows a schematic cross sectional view of another circuit arrangement.

FIG. 3 shows a schematic cross sectional view of another circuit arrangement 300. The circuit arrangement 300 comprises signal layers 302 and 304. The circuit board 300 comprises ground layers 306, 308, 310, 312, and 314. The circuit board 300 also comprises voltage layers 316 and 318. The signal layer 302 is connected with a signal via 320. The ground layers 306-314 are interconnected by use of ground vias 322 and 324. The voltage layers 316 and 318 are interconnected by use of a voltage via 326. The signal via 320, the ground vias 322 and 324 as well as the voltage via 326 pass through voids in the corresponding layers that are intermediate to the layers that are interconnected by the corresponding vias.

The vias 320, 322, 324, and 326 provide electric connections for the corresponding layers with, e.g., a power domain of the arrangement 300 not shown in FIG. 3.

The layered structure of the circuit arrangement 300 is such that the signal layer 302 is bordered by ground layers 308 and 310 and that the signal layer 304 is bordered by the ground layers 310 and 312. Thus, the voltage layers 316 and 318 are separated from each of the signal layers 302 and 304 by at least an intermediate ground layer. For example, the ground layer 308 is intermediate with respect to the signal layer 302 and the voltage layer 316. This has the advantage, that a signal layer 302, 304 will be effectively shielded from disturbing HF-EM waves generated by displacement currents that bridge a discontinuity in the return path for a return current that flows from a ground layer/via to a voltage layer/via and that is accompanying a HF signal current in the signal via 320 and/or in the signal layer 302 or 304.

For example, a HF signal current traveling from the signal layer 302 along the signal via 320 in the upward direction will cause a return current in the ground vias 322 and 324 and in the voltage via 326. However, the return path for the return current in the voltage via 326 comprises a discontinuity as the return current must "pass" the dielectricum between the ground layer 308 and the voltage layer 316 and/or between the ground layer 306 and the voltage layer 316 in form of displacement currents. The EM waves emitted by the HF displacement currents are confined in the dielectrica between the voltage plane 316 and the ground plane 308 and between the voltage plane 316 and the ground plane 306. The EM waves will therefore not couple into signal wires of the signal planes 302 and 304 and thus no noise is generated by the EM waves in the signal wires.

The voltage layer 316 is furthermore placed at the top of the arrangement 300 and the voltage layer 318 is located at the bottom of the arrangement 300. At the top and at the bottom, the arrangement 300 can be regarded as a multiple reference system because the voltage layers and the ground layer provide different potentials. In contrast, the center of the circuit arrangement 300 can be regarded as a single reference system as only the ground layers 308, 310, and 312 being at ground provide a reference potential. The arrangement in accordance with the invention is particularly advantageous as it allows grouping the layers into multiple and single reference systems which can be interconnected by vias.

Figure 4:
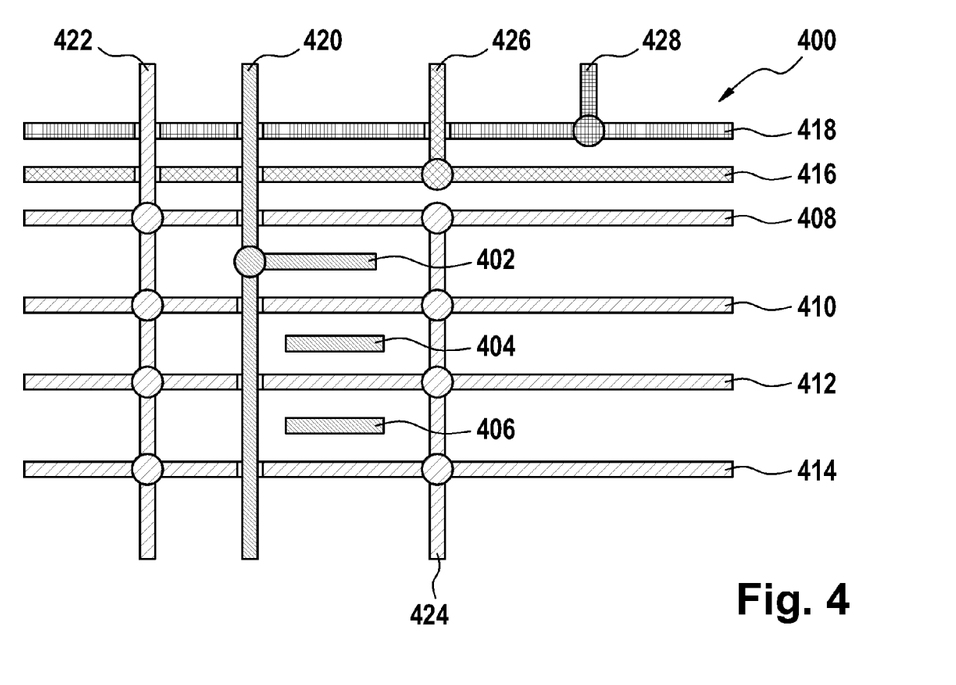
FIG. 4 shows a schematic cross sectional view of yet another circuit arrangement.

FIG. 4 shows a schematic cross sectional view of yet another circuit arrangement 400. The circuit arrangement 400 comprises signal layers 402, 404, and 406. The circuit arrangement 400 further comprises ground layers 408, 410, 412, and 414 and voltage layers 416 and 418. The signal layer 402 is connected with a signal via 420 which is not connected with the signal layers 404 and 406 and that passes the ground layers 408-414 and the voltage layers 416 and 418 through voids in these layers. The ground layers 408-414 are interconnected by ground vias 422 and 424. The voltage layer 416 is connected with a voltage via 426 and the voltage layer 418 is connected with a voltage via 428. The ground vias 422 and 424 and the voltage vias 426 and 428 pass, as the signal via 420 does, through other layers of the circuit arrangement 400 by use of voids in the corresponding layers.

Each signal layer of the circuit arrangement 400 is separated from a voltage layer by at least a ground layer in order to provide an effective shielding from a disturbing HF EM wave that might be generated by a displacement current flowing in a discontinuity of a return path of a return current accompanying a HF signal current.

Moreover, the voltage layers 416 and 418 are arranged at the top of the circuit arrangement 400 so that this inhomogeneous multi reference region is separated from the single reference region below the ground layer 408.

Figure 5:
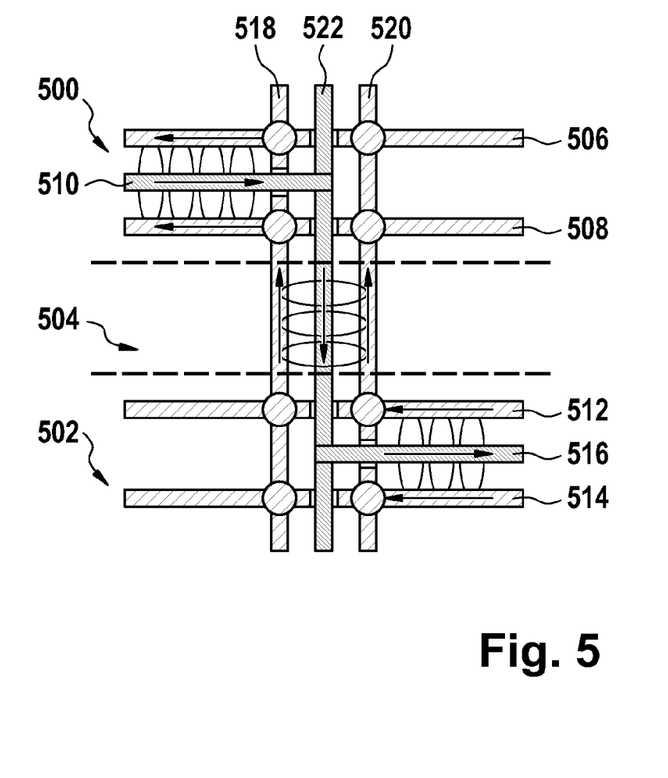
FIG. 5 shows a schematic cross sectional view of two connected circuit boards.

FIG. 5 shows a schematic cross sectional view of a circuit arrangement comprising a first circuit board 500 that is connected with a second circuit board 502 via a connector 504. The first circuit board 500 comprises ground layers 506 and 508 and a signal layer 510 sandwiched in between. The second circuit board 502 comprises ground layers 512 and 514 and a signal layer 516 sandwiched in between. The first circuit board 500 also comprises ground vias 518 and 520 and a signal via 522 that also pass through the circuit board 502. The signal via 522 therefore interconnects the signal layer 510 with the signal layer 516 and the ground vias 518 and 520 interconnect the ground layers of each board.

In order to interconnect the signal via 522 and the ground via 518 and 520 of both boards, the signal via 522 and the ground via 518 and 520 of the first circuit board 500 are adapted to be linked with pins of the connector 504 and the signal via 522 and the ground vias 518 and 520 of the second circuit board 502 are also adapted to be connected with the corresponding pins of the connector 504. Thus, the connector 502 basically comprises the pins for interconnecting the signal vias and ground vias of both circuit boards with each other.

When a HF signal current is flowing from signal plane 510 to signal plane 516 as indicated by the arrows in the signal planes 510, 516 and signal via 522, a HF electromagnetic field is generated as indicated by the circles around the arrows. The HF electromagnetic field induces a HF return current in the adjacent ground planes 506, 508, 512, 514 and ground vias 518, 520 as indicated by the arrows in these planes and vias. The flow of the HF return current is locally directed opposite to the flow of the HF signal current, but the HF return current accompanies the HF signal current when flowing from signal plane 510 to 516. The circuit arrangement comprising the circuit boards 500 and 502 is particularly advantageous as the boards 500 and 502 are adapted to receive the connector 504 which provides due to the arrangement of pins in the connector a close return path for the HF return current and therefore ensures that the HF return current can also travel from the first circuit board 500 to the second circuit board 502.

Figure 6:
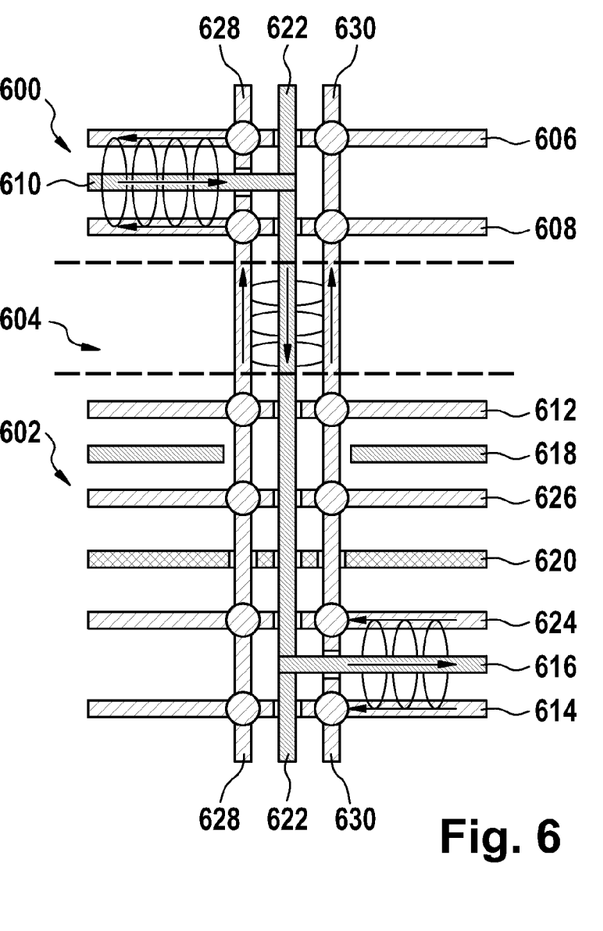
FIG. 6 shows a schematic cross sectional view of two connected circuit boards.

FIG. 6 shows a schematic cross sectional view of a circuit arrangement being implemented on a first circuit board 600, a second circuit board 602 and a connector 604. The first circuit board 600 is connected with the second circuit board 602 via the connector 604.

The first circuit board 600 comprises ground layers 606 and 608 and a signal layer 610 sandwiched in between. The second circuit board 602 comprises ground layers 612 and 614 and a signal layer 616 as well as a signal layer 618 and a voltage layer 620. It is for the moment assumed that the circuit board 602 does not comprise ground layers 624 and 626 that are visible in FIG. 6.

The first circuit board 600 also comprises ground vias 628 and 630 and a signal via 622 that pass also through the circuit board 602. The signal via 622 therefore interconnects the signal layer 610 with the signal layer 616 and the ground vias 628 and 630 interconnect the ground layers of each board.

In order to interconnect the signal via 622 and the ground via 628 and 630 of both boards, the signal via 622 and the ground vias 628 and 630 of the first circuit board 600 are linked via pins of the connector 604 with the corresponding signal via 622 and the ground vias 628 and 630 of the second circuit board 602.

When a HF signal current is flowing from signal plane 610 to signal plane 616 as indicated by the arrows in the signal planes and signal via, a HF electromagnetic field is generated as indicated by the circles around the arrows. The electromagnetic field induces a HF return current in the adjacent ground planes 606, 608, 614, in the voltage layer 620 (for the moment, it is assumed that the ground layer 624 is not present) and in the ground vias 628, 630 as indicated by arrows in these planes and vias. The flow of the HF return current is locally directed opposite to the flow of the HF signal current, but the guided HF return current accompanies the HF signal current.

The return current in the ground vias and ground planes is a wanted return current as its presence is required in order for the HF signal being able to travel from signal plane 610 to signal plane 616.

The HF signal current induces however also an "unwanted" return current in the signal voltage layer 620 which is traveling along with the signal current. The return path of this return current comprises a discontinuity as the return current must flow from ground to the voltage layer 620 by use of a displacement current which generates EM waves that are confined in the dielectrica between the ground layer 614 and the voltage layer 620 and between the ground layer 612 and the voltage layer 620.

Thus, the signal layers 616 and 618 are affected by the EM waves and unwanted coupled noise is induced in the signal wires of these layers.

Considering the circuit board 602 with the ground layer 626 arranged in between the signal layer 618 and the voltage layer 620 and with the ground layer 624 arranged in between the signal layer 616 and the voltage layer 620, the return current flows directly to ground vias 628 and 630. Thus, the signal layers 616 and 618 are not affected by EM waves and unwanted coupled noise is not induced in the signal wires of these layers.

Figure 7:
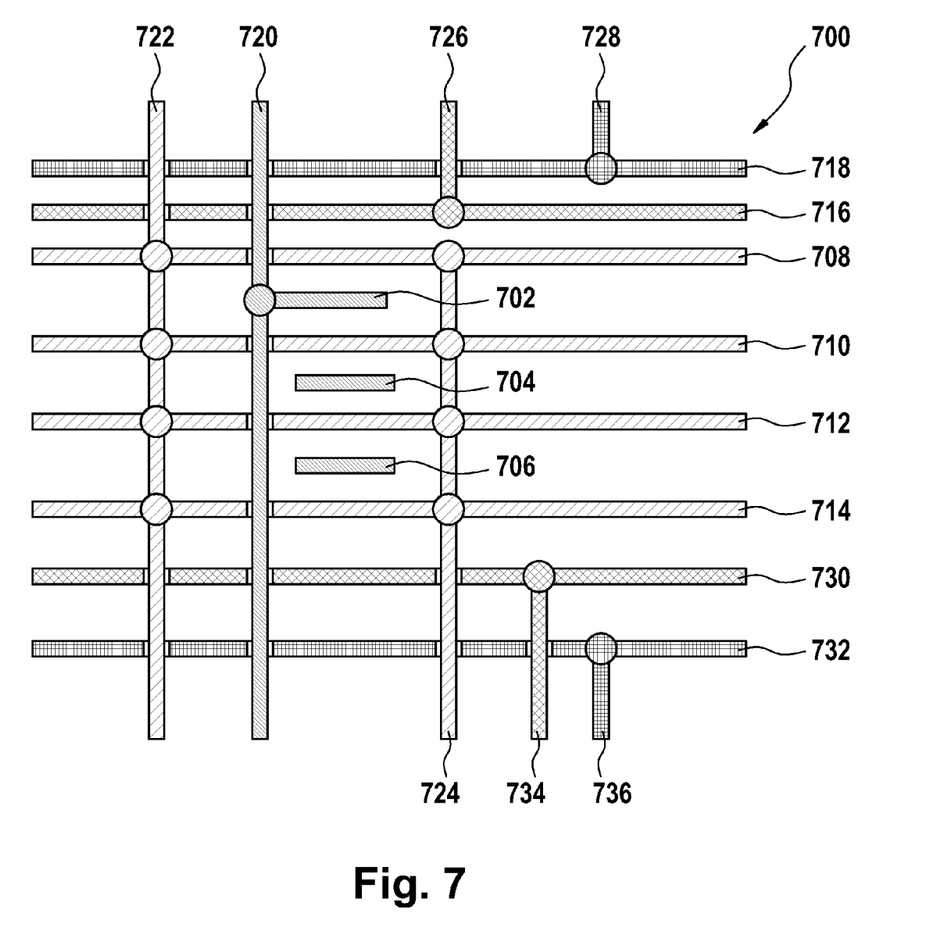
FIG. 7 shows a schematic cross sectional view of another circuit arrangement.

FIG. 7 shows a schematic cross sectional view of another circuit arrangement 700 in accordance with the invention. The circuit arrangement 700 comprises signal layers 702, 704, and 706. The circuit arrangement 700 further comprises ground layers 708, 710, 712, and 714 and voltage layers 716 and 718 as well as voltage layers 730 and 732. The signal layer 702 is connected with a signal via 720 which is not connected with the signal layers 704 and 706 and that passes the ground layers 708-714 and the voltage layers 716 and 718 and 730 and 732 through voids in these layers. The ground layers 708-714 are interconnected by ground vias 722 and 724. The voltage layer 716 is connected with a voltage via 726 and the voltage layer 718 is connected with a voltage via 728.

The voltage layer 730 is connected with a voltage via 734 and the voltage layer 732 is connected with a voltage via 736.

The ground vias 722 and 724 and the voltage vias 726, 728 and 734, 736 pass, as the signal via 720 does, through other layers of the circuit arrangement 700 by use of voids in the corresponding layers.

Each signal layer is separated from a voltage layer by at least a ground layer in order to provide an effective shielding from disturbing HF-EM waves generated from displacement currents that "bridge" discontinuities in return paths of return currents that are induced by a HF signal current in the signal vias and/or layers.

Moreover, the voltage layers 716 and 718 are arranged at the top of the circuit arrangement 700 and the voltage layers 730 and 732 are arranged at the bottom of the circuit arrangement 700. The voltage layers define multi reference regions of the circuit arrangement 700, wherein the ground layers 708-714 define a single reference region of the arrangement 700. The arrangement 700 is particularly advantageous as it allows for an arrangement of multi reference regions and single reference regions and therefore allows for the design of small and compact circuit arrangement. This is particularly important in order to ensure a relative high processing time when such an arrangement is incorporated in a chip module.

The invention claimed is:

1. A circuit arrangement comprising:
one or more signal layers;
one or more ground layers;
one or more voltage layers;
one or more signal vias for connecting with the one or more signal layers;
one or more ground vias for connecting with only the one or more ground layers;
one or more voltage vias for connecting with only the one or more voltage layers;
wherein at least one signal via of the one or more signal vias provides a signal path for a high-frequency (HF) signal current;
wherein at least one ground via of the one or more ground vias and at least a voltage via of the one or more voltage vias provide return paths for return currents associated with the signal current;
wherein the return path provided by the voltage via of the one or more voltage vias is connected with a voltage layer of the one or more voltage layers; and
wherein at least one ground layer of the one or more ground layers is arranged between the voltage layer of the one or more voltage layers and each signal layer of the one or more signal layers.

2. The circuit arrangement according to claim 1, wherein the voltage layer of the one or more voltage layers is bordered at the bottom and/or at the top by ground layers of the one or more ground layers.

3. The circuit arrangement according to claim 1, wherein the voltage layer of the one or more voltage layers is embedded in ground layers of the one or more ground layers.

4. The circuit arrangement according to claim 1, wherein the voltage via of the one or more voltage vias ends at the voltage layer of the one or more voltage layers, wherein a ground via of the one or more ground vias ends at the ground layer of the one or more ground layers bordering the voltage layer of the one or more voltage layers, wherein the ground via of the one or more ground vias and the voltage via of the one or more voltage vias are facing each other.

5. The circuit arrangement according to claim 1, wherein the one or more ground layers and the one or more voltage layers comprise electrically conductive solid planes.

6. The circuit arrangement according to claim 1, wherein the one or more ground layers and the one or more voltage layers comprise electrically conductive mesh planes.

7. The circuit arrangement according to claim 1, wherein directly below the voltage via of the at least one or more voltage vias is a break, and wherein directly below the break is a ground via of the one or more ground vias.

8. A circuit board comprising:
one or more signal layers;
one or more ground layers;
one or more voltage layers;
one or more signal vias for connecting with the one or more signal layers;
one or more ground vias for connecting with only the one or more ground layers;
one or more voltage vias for connecting with only the one or more voltage layers
wherein at least one signal via of the one or more signal vias provides a signal path for a high-frequency (HF) signal current;
wherein at least one ground via of the one or more ground vias and at least a voltage via of the one or more voltage vias provide return paths for return currents associated with the signal current;
wherein the return path provided by the voltage via of the one or more voltage vias is connected with a voltage layer of the-one or more voltage layers; and
wherein at least one ground layer of the one or more ground layers is arranged between the voltage layer of the one or more voltage layers and each signal layer of the one or more signal layers.

9. The circuit board according to claim 8, wherein the voltage layer of the one or more voltage layers is bordered at the bottom and/or at the top by ground layers of the one or more ground layers.

10. The circuit board according to claim 8, wherein the voltage layer of the one or more voltage layers is embedded in ground layers of the one or more ground layers.

11. The circuit board according to claim 8, wherein the voltage via of the one or more voltage vias ends at the voltage layer of the one or more voltage layers, wherein a ground via of the one or more ground vias ends at the ground layer of the one or more ground layers bordering the voltage layer of the one or more voltage layers, wherein the ground via of the one or more ground vias and the voltage via of the one or more voltage vias are facing each other.

12. The circuit board according to claim 8, wherein the one or more ground layers and the one or more voltage layers comprise electrically conductive solid planes.

13. The circuit board according to claim 8, wherein the one or more ground layers and the one or more voltage layers comprise electrically conductive mesh planes.

14. The circuit board according to claim 8, wherein directly below the voltage via of the at least one or more voltage vias is a break, and wherein directly below the break is a ground via of the one or more ground vias.

15. A single chip module (SCM) comprising:
one or more signal layers;
one or more ground layers;
one or more voltage layers;
one or more signal vias for connecting with the one or more signal layers;
one or more ground vias for connecting with only the one or more ground layers;
one or more voltage vias for connecting with only the one or more voltage layers;
wherein at least one signal via of the one or more signal vias provides a signal path for a high-frequency (HF) signal current;
wherein at least one ground via of the one or more ground vias and at least a voltage via of the one or more voltage vias provide return paths for return currents associated with the signal current;
wherein the return path provided by the voltage via of the one or more voltage vias is connected with a voltage layer of the one or more voltage layers; and
wherein at least one ground layer of the one or more ground layers is arranged between the voltage layer of the one or more voltage layers and each signal layer of the one or more signal layers.

16. The module according to claim 15, wherein the voltage layer of the one or more voltage layers is bordered at the bottom and/or at the top by ground layers of the one or more ground layers.

17. The module according to claim 15, wherein the voltage layer of the one or more voltage layers is embedded in ground layers of the one or more ground layers.

18. The module according to claim 15, wherein the voltage via of the one or more voltage vias ends at the voltage layer of the one or more voltage layers, wherein a ground via of the one or more ground vias ends at the ground layer of the one or more ground layers bordering the voltage layer of the one or more voltage layers, wherein the ground via of the one or more ground vias and the voltage via of the one or more voltage vias are facing each other.

19. The module according to claim 15, wherein the one or more ground layers and the one or more voltage layers comprise electrically conductive solid planes.

20. The module according to claim 15, wherein the one or more ground layers and the one or more voltage layers comprise electrically conductive mesh planes.

21. The module according to claim 15, wherein directly below the voltage via of the at least one or more voltage vias is a break, and wherein directly below the break is a ground via of the one or more ground vias.

* * * * *